US012580917B2

(12) United States Patent
Lee et al.

(10) Patent No.: US 12,580,917 B2
(45) Date of Patent: Mar. 17, 2026

(54) REUSABLE GENERIC WORKER FOR SECURE LOADING AND COMPILATION OF WebAssembly IN WEB APPLICATIONS

(71) Applicant: Microsoft Technology Licensing, LLC, Redmond, WA (US)

(72) Inventors: Seung Won Lee, Redmond, WA (US); Konstantin Pik, Redmond, WA (US); Anastasiya Sarmant, Redmond, WA (US); Nikita Petrov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 18/819,907

(22) Filed: Aug. 29, 2024

(65) Prior Publication Data

US 2026/0067278 A1 Mar. 5, 2026

(51) Int. Cl.
*H04L 29/06* (2006.01)
*H04L 9/40* (2022.01)

(52) U.S. Cl.
CPC .................................... *H04L 63/10* (2013.01)

(58) Field of Classification Search
None
See application file for complete search history.

(56) References Cited

U.S. PATENT DOCUMENTS 11,023,558 B1 * 6/2021 Kurien .................. G06F 16/168
11,329,931 B2 * 5/2022 Sugarev ................ H04L 47/762

2011/0282940 A1 * 11/2011 Zhang ................... G06F 9/5072
709/204
2022/0121470 A1 * 4/2022 Saxena ................... H04L 63/20
2022/0158831 A1 * 5/2022 Wing .................. H04L 63/1466
(Continued)

FOREIGN PATENT DOCUMENTS

CN 116567290 A 8/2023

OTHER PUBLICATIONS

Pisano, Davide; Servetti, Antonio. Audio-aware applications at the edge using in-browser WebAssembly and fingerprinting. 2023 4th International Symposium on the Internet of Sounds. https://ieeexplore. ieee.org/stamp/stamp.jsp?tp=&arnumber=10335388 (Year: 2023).*
(Continued)

*Primary Examiner* — Jeremiah L Avery
(74) *Attorney, Agent, or Firm* — Schwegman Lundberg & Woessner, P.A.

(57) ABSTRACT

A system for secure dynamic loading and execution of web workers and WebAssembly modules in web-based communication applications employs a reusable generic worker approach. The system includes a main application executing in its own environment subject to a first content security policy, which loads a first web worker from a resource indicated by this policy. The first web worker executes in its own environment, specifies a second content security policy, and dynamically loads and executes additional web workers or compiles WebAssembly modules upon request from the main application. This approach improves flexibility, efficiency, and security by offloading resource-intensive tasks, simplifying security implementations, enhancing scalability, and boosting performance for real-time audio and video processing in communication applications.

20 Claims, 5 Drawing Sheets

(56) References Cited

U.S. PATENT DOCUMENTS

| | | | | |
|---|---|---|---|---|
| 2024/0291847 | A1 * | 8/2024 | Tsarynny | .............. H04L 63/10 |
| 2024/0364783 | A1 * | 10/2024 | Varda | ................. H04L 67/1021 |
| 2025/0080537 | A1 * | 3/2025 | Sawant | .................. H04L 63/10 |

OTHER PUBLICATIONS

Stotoglou, Anastasios; Kaskalis, Theodore H. Comparative Study of JavaScript and WebAssembly Derivatives in Browser Engines. 2023 Intelligent Methods, Systems, and Applications (IMSA). https://ieeexplore.ieee.org/stamp/stamp.jsp?tp=&arnumber=10217486 (Year: 2023).*

Wen, Elliott; Weber, Gerald. Wasmachine: Bring IoT up to Speed with a WebAssembly OS. 2020 IEEE International Conference on Pervasive Computing and Communications Workshops (PerCom Workshops). https://ieeexplore.ieee.org/stamp/stamp.jsp?tp=&arnumber=9156135 (Year: 2020).*

Rossi, Lorenzo; Ferretti, Luca. WebDHT: browser-compatible distributed hash table for decentralized Web applications. 2022 IEEE 21st International Symposium on Network Computing and Applications (NCA). https://ieeexplore.IEEE.org/stamp/stamp.jsp?tp=&arnumber=10013537 (Year: 2022).*

International Search Report and Written Opinion received for PCT Application No. PCT/US2025/034710, mailed on Sep. 23, 2025, 14 pages.

"The Problem with Time & Timezones—Computerphile", Retrieved from: https://www.youtube.com/watch?v=-5wpm-gesOY, Dec. 30, 2013, 03 Pages.

"Time . . . a programmer's worst enemy // The Code Report", Retrieved from: https://www.youtube.com/watch?v=iMVgvkVJuDI, Mar. 17, 2022, 04 Pages.

* cited by examiner

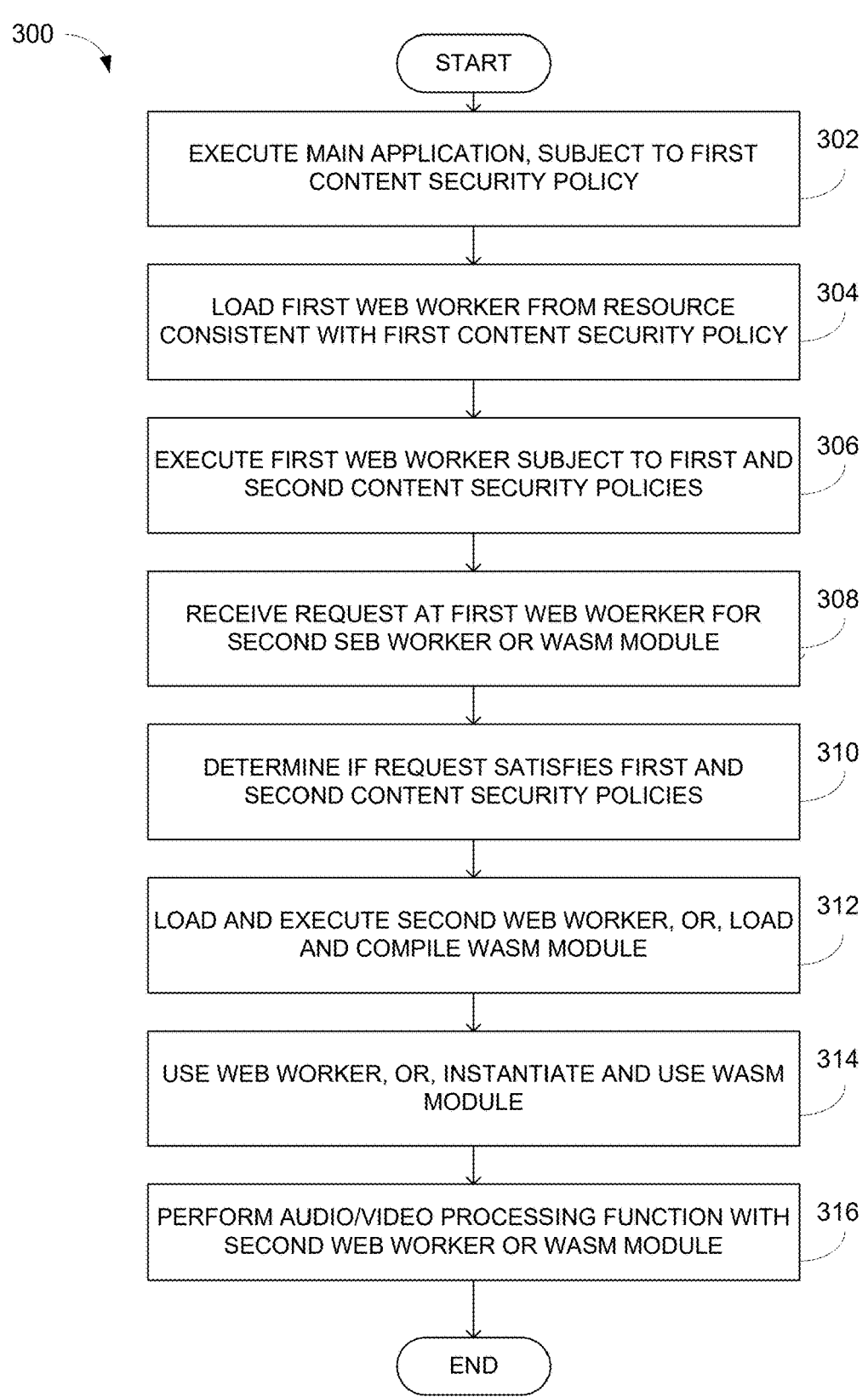

300

START

EXECUTE MAIN APPLICATION, SUBJECT TO FIRST CONTENT SECURITY POLICY — 302

LOAD FIRST WEB WORKER FROM RESOURCE CONSISTENT WITH FIRST CONTENT SECURITY POLICY — 304

EXECUTE FIRST WEB WORKER SUBJECT TO FIRST AND SECOND CONTENT SECURITY POLICIES — 306

RECEIVE REQUEST AT FIRST WEB WOERKER FOR SECOND SEB WORKER OR WASM MODULE — 308

DETERMINE IF REQUEST SATISFIES FIRST AND SECOND CONTENT SECURITY POLICIES — 310

LOAD AND EXECUTE SECOND WEB WORKER, OR, LOAD AND COMPILE WASM MODULE — 312

USE WEB WORKER, OR, INSTANTIATE AND USE WASM MODULE — 314

PERFORM AUDIO/VIDEO PROCESSING FUNCTION WITH SECOND WEB WORKER OR WASM MODULE — 316

END

FIG. 3

REUSABLE GENERIC WORKER FOR SECURE LOADING AND COMPILATION OF WebAssembly IN WEB APPLICATIONS

TECHNICAL FIELD

The present application pertains to the technical field of secure dynamic loading and execution of web workers and WebAssembly modules in web-based communication applications. More specifically, it involves a reusable "generic" web worker for securely loading other function-specific web workers, and for loading, compiling, and executing WebAssembly modules, within the constraints of content security policies. The techniques described herein are relevant to enhancing the performance and security of web-based audio and video communication applications, utilizing a multi-threaded architecture to efficiently load and execute resource-intensive functions such as noise suppression, acoustic echo cancellation, voice quality enhancement, and background blur, thereby facilitating a more secure and efficient communication experience.

BACKGROUND

Web-based communication applications have rapidly evolved, offering users a diverse array of features for seamless audio and video interactions over networks. These sophisticated applications leverage advanced web technologies to deliver communication experiences, which can be either directly within web browsers or through standalone web-based platforms, thus eliminating the need for traditional software installations. Key technologies that underpin these modern web applications include Web Workers, WebAssembly ("WASM"), and Content Security Policies ("CSP").

Web Workers enable multi-threaded execution by allowing scripts to run in background threads, separate from the main execution thread of a web page or web-based application, ensuring that user interactions remain responsive even during computationally intensive tasks. WebAssembly, a binary instruction format, facilitates the execution of code written in languages like C++ at near-native speeds within web environments, making it ideal for performance-critical functions such as real-time audio and video processing. Additionally, Content Security Policies play a crucial role in securing web applications by controlling the resources a web page can load and execute, thus mitigating risks like cross-site scripting. The integration of these technologies into both browser-based and standalone web-based communication platforms enhances their performance and security, but also presents challenges in balancing high-performance computing needs with stringent security requirements.

BRIEF DESCRIPTION OF THE DRAWINGS

Embodiments of the present invention are illustrated by way of example and not limitation in the figures of the accompanying drawings, in which:

FIG. 3 is a flowchart presenting the method steps, including the execution of the main application, loading and execution of web workers, and the loading, compilation, and instantiation of WebAssembly modules for audio and video processing functions, consistent with some embodiments.

DETAILED DESCRIPTION

Figure 1:
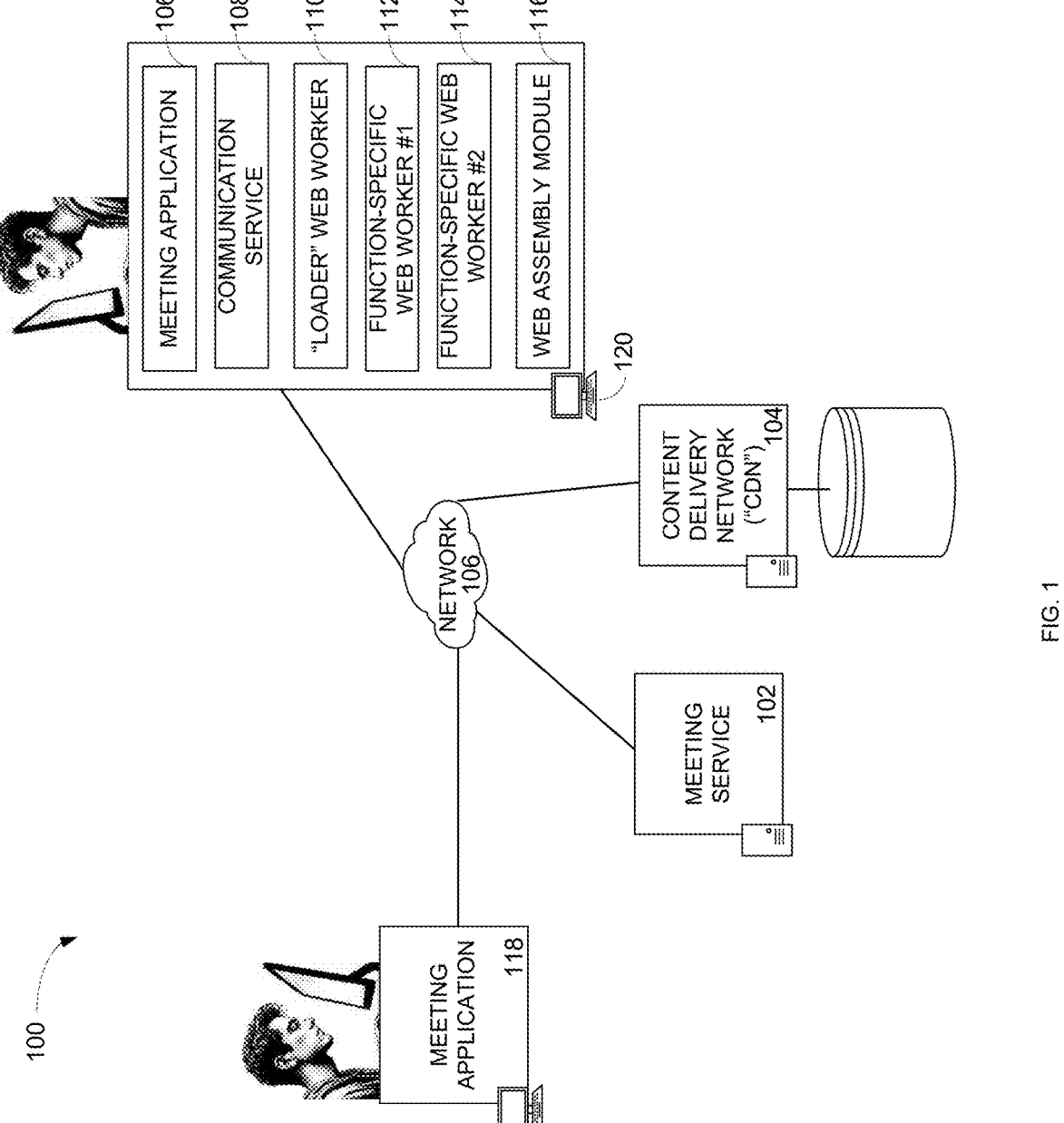
FIG. 1 is a system diagram illustrating a meeting application with various content delivery networks ("CDNs") and two or more end-users with connected computers, showcasing the overall architecture of the web-based communication system, consistent with embodiments.

Described herein are techniques for secure dynamic loading and execution of web workers and WebAssembly ("WASM") modules in web-based communication applications, particularly focusing on a reusable generic worker system that operates within the constraints of content security policies. In some examples, the techniques described herein involve a main application executing in its own environment, subject to a first content security policy, which loads a first web worker from a resource, adhering to this first policy. This first web worker, executing in its own environment, inherits the content security policy from the main application. The first web worker is capable of dynamically loading and executing additional web workers to perform specific tasks or compiling WASM modules upon request from the main application. When initializing secondary specific workers, these workers are governed by the first content security policy of the first web worker, which allows for the necessary WASM compilation. By employing a multi-threaded architecture, the system efficiently loads and executes resource-intensive functions such as noise suppression, acoustic echo cancellation, voice quality enhancement, and background blur, without compromising security. The system allows for the offloading of compilation and execution of WASM modules to a separate thread, improving performance and responsiveness of the main application thread. This approach enables the use of web standards to enforce security policies, minimizing the need for custom security implementations and reducing the complexity of code changes when updating or adding new functionalities. The following description provides detailed insights into the operation of this system, setting forth specific details to ensure a comprehensive understanding of the various embodiments of the present invention. It should be noted, however, that the present invention may be adapted with various modifications and alterations to the details and features described herein, as would be apparent to one skilled in the art.

Web-based communication and meeting applications, such as Microsoft Teams®, have increasingly incorporated WASM modules to perform processor-intensive functions that require real-time processing of audio and video signals. WASM is a binary instruction format designed for efficient execution in web browsers and web-based applications. It allows code written in languages like C++ to be compiled into a low-level, assembly-like language that can run at near-native speed within a web environment. Typically, WASM modules are loaded, compiled, and instantiated in real-time as needed by web applications. The process usually involves fetching the WASM module from a server, compiling it within the browser or web-app environment, and then instantiating it for execution.

To facilitate the execution of these WASM modules and other background tasks, web applications often employ web workers. Web Workers are a simple means for web content to run scripts in background threads. Web workers enable multi-threaded execution in web applications by allowing scripts to perform tasks without interfering with the user interface. Web applications typically gain access to web workers by creating a new Worker object and specifying the URL of a JavaScript file to be executed in the worker thread. For example, a web application might create a web worker using code like new Worker('worker.js'). Once created, the main application can communicate with the web worker through a messaging system, sending data and receiving results without blocking the main thread.

In web-based communication applications, WASM modules are frequently used for processor-intensive tasks such as real-time audio and video processing. For instance, in video conferencing scenarios, WASM modules are utilized for background blur effects, which require complex image processing algorithms to separate the foreground (i.e., the meeting participant) from the background in real-time. This feature enhances privacy and reduces visual distractions during video calls. In the realm of audio processing, WASM modules are employed for functions such as noise suppression, which filters out unwanted background noise to improve audio clarity. Acoustic echo cancellation is another critical function that uses WASM modules to eliminate echo effects that can occur during audio calls. Additionally, voice quality enhancement algorithms implemented through WASM modules can adjust and optimize audio signals to improve overall sound quality.

Traditionally, these web-based communication applications have been hard-coded to load specific WASM modules and invoke or instantiate web workers for each of these functions. This approach typically involves embedding the logic for loading and executing these modules directly into the main application code. For example, the application might have predefined paths or URLs for fetching the required WASM modules, and specific initialization routines for each type of web worker needed for different audio or video processing tasks.

However, this conventional technique presents several technical problems. Firstly, any changes or updates made to the web workers or WASM modules often necessitate corresponding updates to the code of the main communication application that leverages these various functions. This tight coupling between the main application and its auxiliary modules creates a significant maintenance challenge, as even minor changes in the auxiliary modules can require extensive modifications to the main application code.

Secondly, this approach can lead to inefficiencies in resource utilization. Each time a new feature or function is added, it may require the creation of a new web worker or the loading of an additional WASM module, potentially resulting in unnecessary duplication of code and increased memory usage. Furthermore, the conventional implementation often requires customized solutions when it comes to implementing Content Security Policies ("CSPs"). As each WASM module or web worker may have different security requirements, managing these individually within the main application can lead to complex and potentially error-prone security configurations. This presents a technical problem in terms of maintaining robust security practices while allowing for the necessary flexibility in loading and executing external resources.

Another technical problem arises from the lack of scalability in this approach. As new features are added or existing ones are updated, the main application needs to be modified to accommodate these changes. This not only increases the complexity of the codebase but also makes it more challenging to experiment with or A/B test new functionalities without making significant changes to the core application.

These technical problems collectively highlight the need for a more flexible, efficient, and secure approach to loading and executing WASM modules and web workers in web-based communication applications. The techniques described herein address these challenges by providing a reusable generic worker system that operates within the constraints of content security policies, offering improved performance, security, and maintainability for web-based communication applications.

To address the technical problems associated with conventional approaches to loading and executing WASM modules and web workers in web-based communication applications, a new system has been developed that employs a generic worker approach with reusable functionality. This system operates within the constraints of content security policies while offering improved flexibility, efficiency, and security. The terms "reusable" and "generic" in this context refer to specific characteristics of the web worker system described.

As used herein, "reusable" indicates that the first worker script can be repurposed for multiple specific tasks within the context of web-based communication applications. This reusability allows the generic worker to transform into different specific workers as needed, providing a seamless experience from an external perspective. The generic worker operates to load other web workers and load and compile WASM modules based on instructions or directives received from the main application, specifically for tasks such as transforming a generic worker into a specific worker for audio or video processing. This approach allows for more efficient resource utilization and improved performance, particularly in the context of web-based communication applications.

As used herein, "generic" signifies that this web worker is not specialized for a particular function, but rather serves as a versatile loader for various types of resources. It is distinct from "function-specific" web workers that perform specific tasks like video and audio signal processing. Instead, this generic worker's primary role is to offload the work of loading other web workers and loading/compiling WASM modules from the main application.

The term "loader worker" is indeed used interchangeably with "generic worker" to emphasize its primary function of loading resources on behalf of the main application. This approach allows the main application to delegate the resource-intensive tasks of fetching, loading, and compiling to a separate thread, improving overall performance and responsiveness.

Consistent with some embodiments, the system introduces a main application that executes in its own environment, subject to a first content security policy. This main application loads a first web worker, referred to as the generic worker or loader worker from static resource. The generic worker inherits a second content security policy that allows it to compile and instantiate WebAssembly. Upon receiving a request from the main application, the generic worker can dynamically load and execute additional web workers and scripts, or load and compile WebAssembly modules. This process adheres to both the first and second content security policies, ensuring a secure execution environment.

When the main application needs to perform a specific function, such as noise suppression or background blur, it sends a request to the generic worker. The generic worker then fetches the required WASM module or additional web worker or script from a content delivery network or a local resource, depending on the implementation. This fetching process is governed by the content security policies in place, ensuring that resources are only loaded from trusted sources.

For WASM modules, the generic worker handles the compilation process within its own execution context. This offloading of compilation to a separate thread improves the performance and responsiveness of the main application thread. Once compilation is complete, the generic worker notifies the main application, which can then instantiate and use the WASM module as needed.

The system's design allows for efficient resource utilization and improved performance. Instead of creating separate web workers for each function, the generic worker can be reused to load and manage multiple WASM modules or additional web workers. This approach offloads tasks from the Teams frontend services to the worker thread, decreasing memory usage of the main thread while maintaining overall memory efficiency. Additionally, it provides a unified API for other code consumption, reducing code duplication across the application. By centralizing the loading and execution of resources through the generic worker, the system simplifies the implementation process and improves scalability for adding new functionalities.

Furthermore, the system simplifies the implementation of content security policies. By centralizing the loading and execution of external resources through the generic worker, the system can enforce consistent security practices across all loaded modules. This eliminates the need for custom security implementations for each individual WASM module or web worker.

The reusable nature of the generic worker also enhances scalability. When new features are added or existing ones are updated, changes can often be implemented by updating the WASM modules or web workers without requiring modifications to the main application code. This separation of concerns makes it easier to experiment with or A/B test new functionalities.

By streamlining the process of loading and executing WASM modules and web workers, the system reduces latency and improves overall performance. Features can be loaded and initialized more efficiently, leading to a more responsive user experience, particularly in real-time communication scenarios.

Accordingly, this system provides a more flexible, efficient, and secure approach to loading and executing WASM modules and web workers in web-based communication applications. It addresses the technical problems associated with conventional approaches by simplifying security implementations, and enhancing scalability. Other aspects and advantages of the various embodiments will be readily apparent from the detailed description of the several figures that follows.

FIG. 1 illustrates a network environment in which two end-users are engaged in a communication session using web-based meeting applications (106 and 118) via a cloud-based meeting service 102. The figure provides a detailed view of one client system 120, showcasing the integration of the meeting application 106 with various components that enable secure and efficient real-time communication.

The client system 120, which executes the main application thread—that is, the meeting application 106—is configured to operate and be integral with a communication service 108. This integration allows for seamless handling of audio and video processing tasks required for high-quality real-time communication. During a communication session (e.g., an audio- or video-based call), the system employs a dynamic and secure approach to loading necessary resources.

The loader web worker 110, also referred to as the generic worker, is responsible for loading additional web workers (e.g., 112 and 114) and loading and compiling WASM modules 116. When a call is initiated by the communication service 108, the loader web worker 110 is loaded from a content delivery network 104 and executed by the communication service 108. This download process adheres to the content security policy of the meeting application 106, ensuring that only trusted resources are loaded and executed.

Once the loader web worker 110 is active, it takes on the responsibility of loading additional web workers and WASM modules as needed. For example, when the communication service 108 requires a specific functionality, it sends a request to the loader web worker 110. In response, the loader web worker 110 fetches and loads web worker #1 112. This process can be repeated for different functionalities, as illustrated by the subsequent loading of web worker #2 114.

To provide a concrete example, let's consider a scenario where a user enables background blur during a video call. The communication service 108 would send a request to the loader web worker 110 for this functionality. The loader worker 110 would then fetch and load a specific web worker (e.g., web worker #1 112) designed for video processing tasks. This web worker #1 112 would handle the complex image processing required for real-time background blur.

Similarly, for audio enhancement features like noise suppression or echo cancellation, the loader web worker might load another specialized web worker (e.g., web worker #2 114) dedicated to audio processing tasks. In addition to loading web workers, the loader web worker 110 is also responsible for loading and compiling WASM modules. The figure shows a WASM module 116 having been loaded, compiled and instantiated, which could represent a module for advanced audio or video processing algorithms. For instance, if the meeting application 106 requires a sophisticated voice quality enhancement feature, the loader worker 110 would fetch the corresponding WASM module from the CDN 104, compile it, and make it available for use by the meeting application 106, the communication service 108 or an appropriate web worker.

This dynamic loading approach offers several advantages. It allows the meeting application 106 to efficiently manage resources by loading only the necessary components when they are needed. It also provides flexibility in updating or adding new features without requiring changes to the main application code. Furthermore, by centralizing the loading process through the loader web worker 110, the system can consistently enforce security policies across all loaded resources.

The use of a CDN 104 for storing and delivering these resources ensures fast and reliable access across different geographical locations. This is particularly important for maintaining low latency in real-time communication applications.

Accordingly, FIG. 1 depicts a system where the meeting application, communication service 102, and loader web worker 110 work in concert to provide a secure, efficient, and feature-rich communication experience. The loader web worker 110 serves as a central hub for dynamically loading and managing the various components needed for real-time audio and video processing, all while adhering to the meeting application's content security policies.

Figure 2:
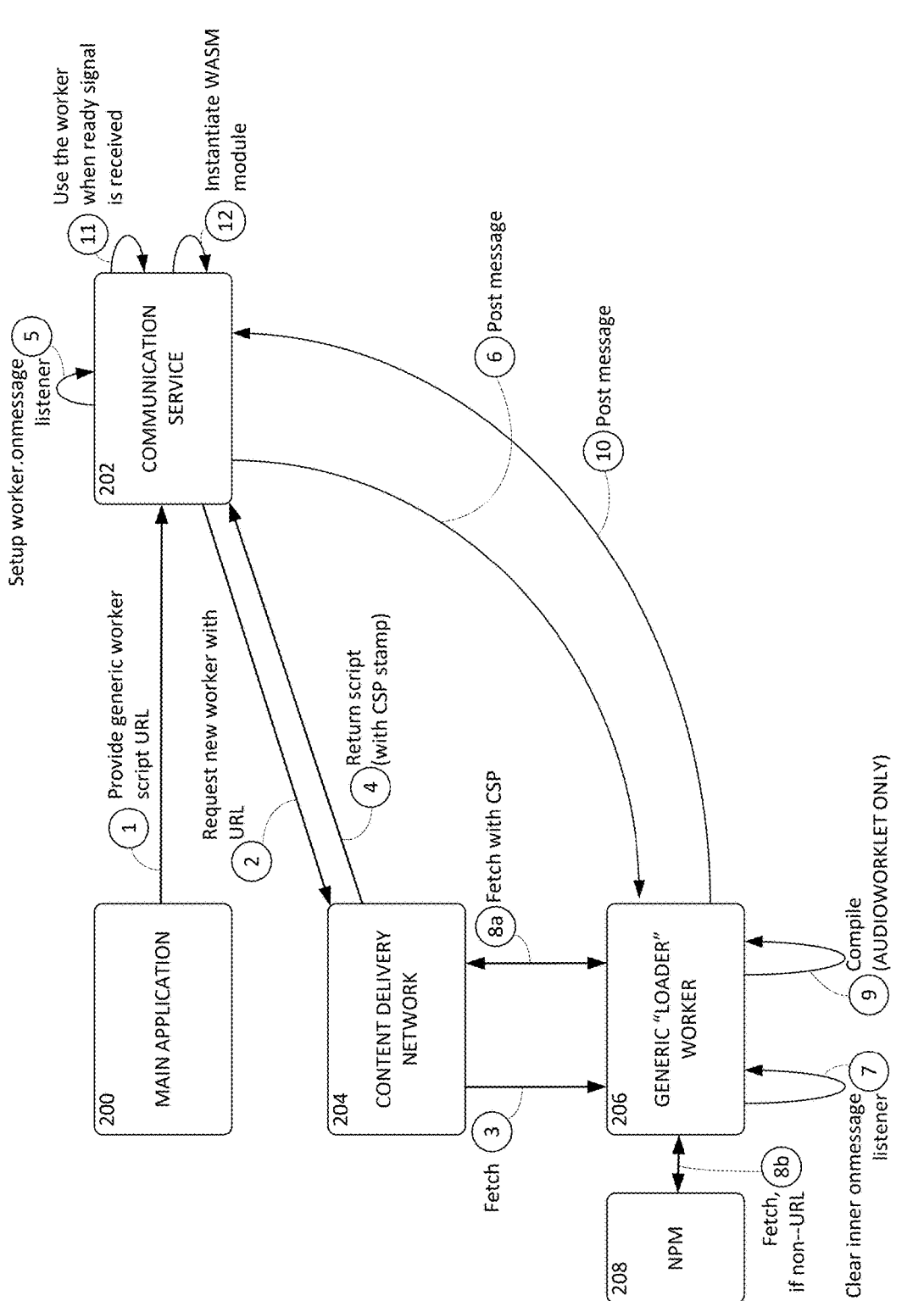
FIG. 2 is a diagram depicting the flow of data between components over the network, including the main application, web workers, the WebAssembly modules, and the CDNs, demonstrating the secure loading and execution process within the constraints of content security policies, consistent with embodiments.

FIG. 2 illustrates a more detailed and intricate flow of data between the main application components (e.g., 200 and 202) and the CDN 204, showcasing a secure and efficient process for loading and executing web workers and WASM modules. The process begins with the main application 200 providing the uniform resource locator ("URL") of the generic worker script to the communication service 202, as indicated by arrow annotated with the number one ("1") in the enclosed circle. This URL points to the location of the loader worker script on the CDN 204, setting the stage for the subsequent steps.

Upon receiving the URL, the communication service 202 initiates the creation of a new worker by making a network call to the CDN 204, as indicated by arrow annotated with enclosed circle with the number "2", for step two. This call fetches the generic worker script from the specified location. The CDN 204, acting as a distributed network of servers, retrieves the requested script (step 3) and returns it to the communication service (step 4). The returned script comes with a Content Security Policy (CSP) stamp, which is an integral part of the script. This CSP stamp plays a role in security, dictating where the script can be executed and effectively preventing cross-site scripting or injection execution attempts.

Once the generic worker script is received, the communication service 202 sets up a worker.onmessage listener (step 5). This listener establishes a communication channel between the main application 200 and the generic worker, allowing for the exchange of messages and data. With this setup in place, the communication service 200 can now post a message to the generic worker (step 6), typically specifying a task or requesting a specific worker or WebAssembly module. For instance, it might request a WASM CV (Computer Vision) module for video processing tasks.

Upon receiving this message, the generic worker takes several steps. First, it clears its inner onmessage listener (step 7), preparing itself to handle the new request. Then, based on the nature of the requested resource, the generic worker initiates a fetch operation. If the resource is URL-based, it fetches from the CDN. For non-CDN URLs, the resource is retrieved from the web server (Package Delivery Service or PDS), with NPM serving as the source of truth to deliver files for the build (step 8). Importantly, this fetch operation is conducted with the CSP in place, ensuring that security measures are maintained throughout the process.

In the specific case of AudioWorklet requests, the generic worker performs an additional step of the the compiling WebAssembly module using WebAssembly.compileStreaming( ) method (step 9). This compilation process occurs within the worker context, offloading this potentially resource-intensive task from the main application thread. Crucially, this step is also necessary to satisfy the content security policies in place Once the requested resource is fetched and, if necessary, compiled, the generic worker posts a message (step 10) back to the communication service or main application. For a regular worker, this message indicates that the worker is ready. In the case of an Audio Worklet, the message contains the compiled WebAssembly module. This notification allows the main application to proceed with using the newly loaded and prepared resources.

Finally, upon receiving the ready signal (step 11), the main application can begin utilizing the worker. In the specific case of AudioWorklet, an additional step (step 12) occurs where the main application 200 instantiates the WebAssembly module and passes the Audio WorkletProcessor via processorOptions. This final step completes the process, making the new functionality fully available to the main application 200.

This entire process, from the initial URL provision to the final instantiation, demonstrates an approach to dynamically and securely loading web workers and WebAssembly modules. By leveraging the generic worker as an intermediary between the main application 200 and the resources stored on the CDN or in NPM packages, this system provides a flexible, efficient, and secure method for enhancing web-based communication applications with advanced audio and video processing capabilities.

FIG. 3 illustrates a detailed method for secure dynamic loading and execution of web workers and WASM modules in web-based communication applications. The method comprises several operations, each designed to address the technical challenges associated with conventional approaches while enhancing security, efficiency, and flexibility.

The method begins with the first operation (300) of executing a main application subject to a first content security policy. This operation involves initializing the primary web-based communication application, such as a video conferencing platform, within a secure environment defined by specific content security policy directives. These directives dictate the resources that can be loaded and executed by the main application, establishing a foundational layer of security.

The second operation (302) involves loading a first web worker from a resource indicated by the first content security policy. This operation is crucial as it introduces the generic or loader web worker into the system. The main application fetches this worker from a trusted source, as specified by the content security policy, ensuring that only authorized code is introduced into the application environment.

In the third operation (304), the method executes the first web worker subject to a second content security policy. This step is significant as it establishes a separate execution context for the loader worker, with its own set of security constraints. This separation allows for more granular control over the resources that can be accessed and executed by the loader worker, further enhancing the overall security of the system.

The fourth operation (306) involves receiving a request at the first web worker for a second web worker or WebAssembly module. This operation demonstrates the dynamic nature of the system, where additional resources are loaded on-demand based on the application's needs. For example, the main application might request a specific web worker for audio processing or a WebAssembly module for video enhancement.

In the fifth operation (308), the method determines if the request satisfies the first and second content security policies. This crucial step ensures that any additional resources to be loaded comply with both the main application's security policy and the loader worker's policy. This double-check mechanism provides an extra layer of security, preventing the loading of unauthorized or potentially malicious code.

The sixth operation (310) involves loading and executing the second web worker or loading and compiling the WebAssembly module. Based on the request and security validation from the previous step, the loader worker fetches and initializes the required resource. For a web worker, this means loading and executing the worker script. For a WebAssembly module, it involves fetching the module and compiling it within the secure context of the loader worker.

In the seventh operation (312), the method instantiates the WebAssembly module by the main application. This step is specific to WebAssembly modules and involves creating a live instance of the compiled module within the main application's context. This operation makes the module's functionality available for use by the application.

The final operation (314) involves performing an audio/video processing function using the instantiated WebAssembly module. This step represents the practical application of the loaded resource, where the newly instantiated module is used to carry out specific tasks such as noise suppression, background blur, or other audio/video enhancements required by the communication application.

This method, as illustrated in FIG. 3, provides a comprehensive approach to dynamically loading and executing web workers and WebAssembly modules in a secure and efficient manner. By separating the loading process from the main application, enforcing multiple layers of security checks, and allowing for on-demand resource allocation, the method addresses the technical challenges of flexibility, security, and performance in web-based communication applications.

Machine and Software Architecture

Figure 4:
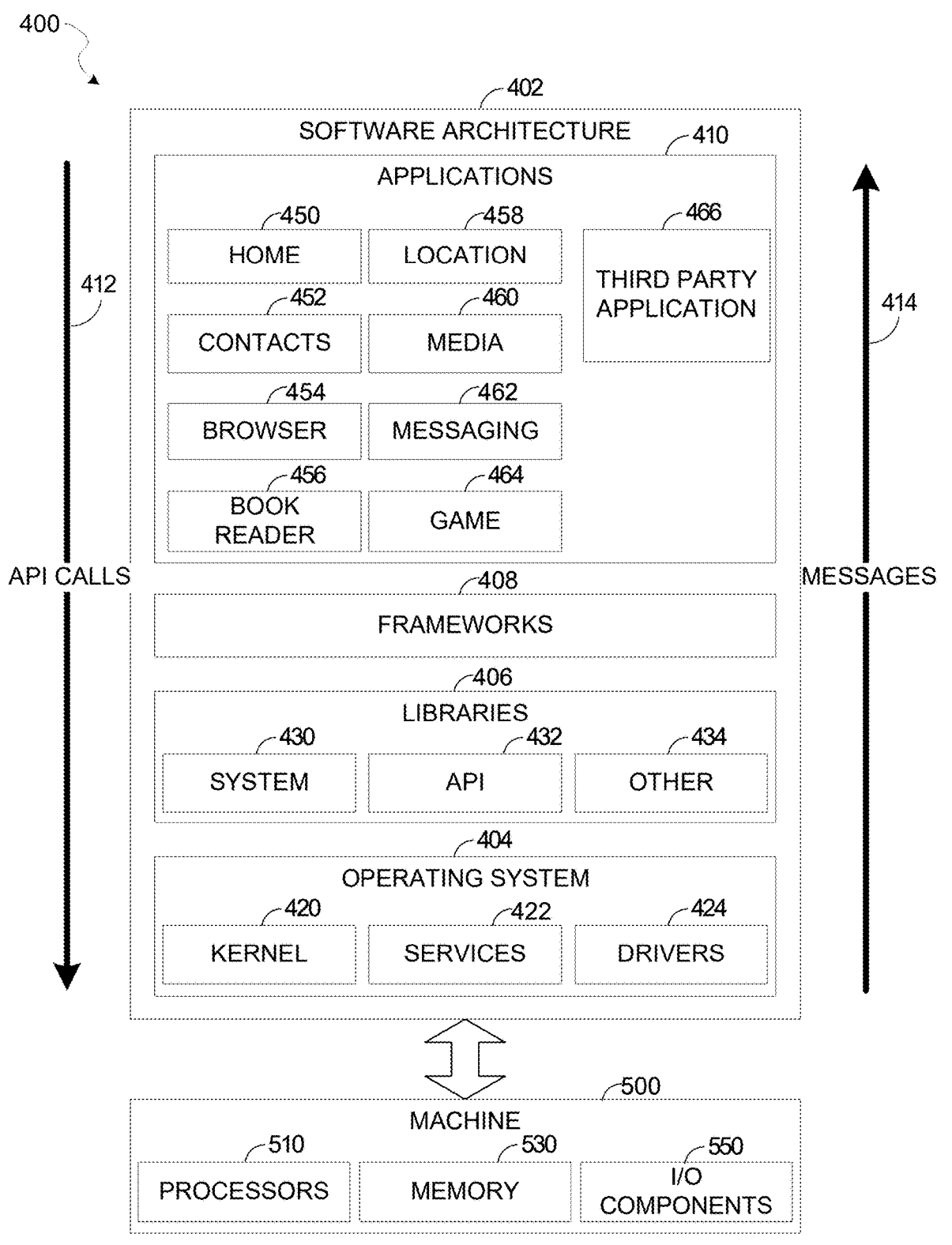
FIG. 4 is a block diagram illustrating a software architecture, which can be installed on any of a variety of computing devices to perform methods consistent with those described herein.

FIG. 4 is a block diagram 400 illustrating a software architecture 402, which can be installed on any of a variety of computing devices to perform methods consistent with those described herein. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 502 includes layers such as an operating system 404, libraries 406, frameworks 408, and applications 410. Operationally, the applications 410 invoke API calls 412 through the software stack and receive messages 414 in response to the API calls 412, consistent with some embodiments.

In various embodiments, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
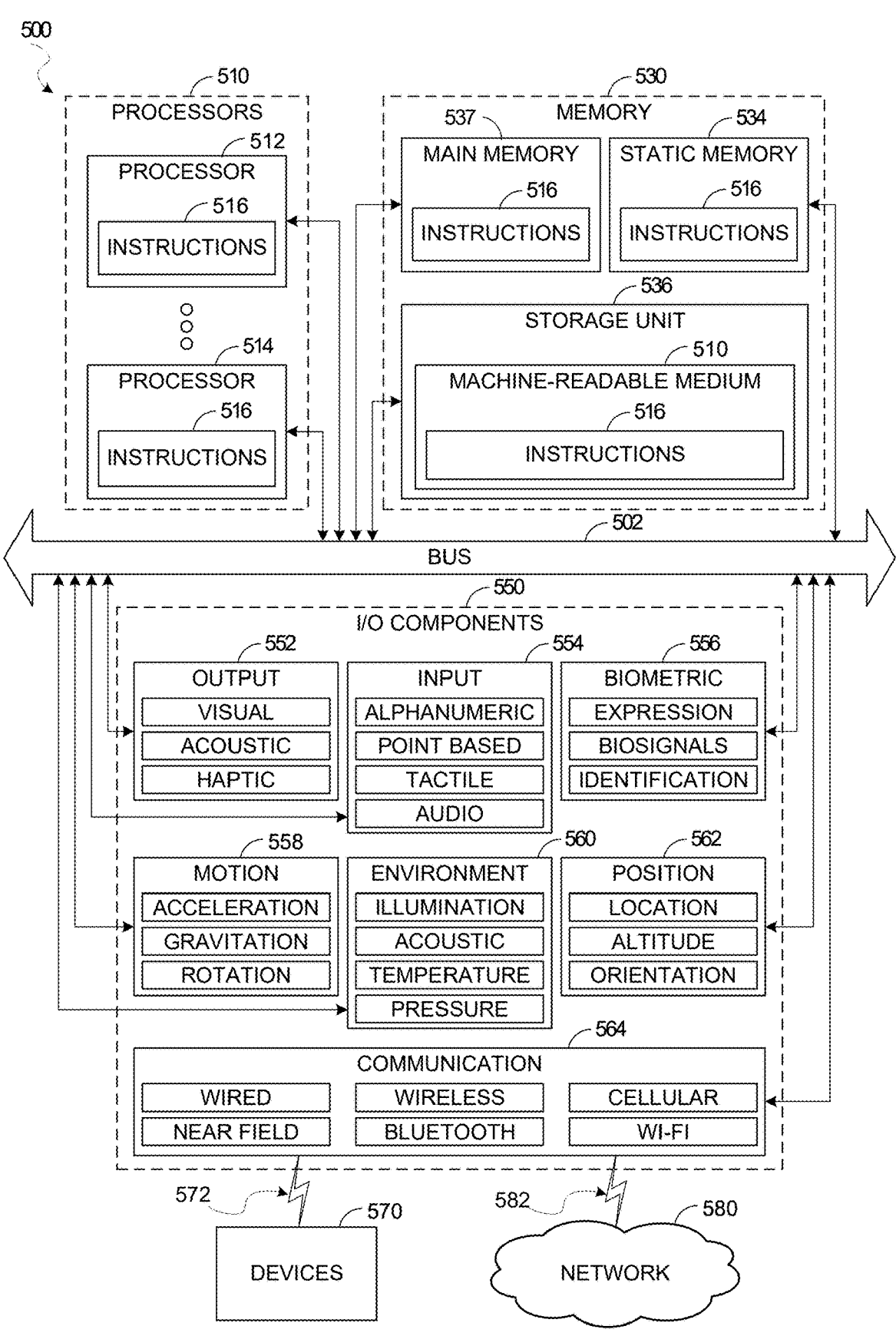
FIG. 5 is a diagrammatic representation of a machine in the form of a computer system (e.g., a server computer) within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions 516 may cause the machine 500 to execute any one of the methods or algorithmic techniques described herein. Additionally, or alternatively, the instructions 516 may implement any one of the systems described herein. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiples cores, or any combination thereof.

The memory 530 may include a main memory 532, a static memory 534, and a storage unit 536, all accessible to the processors 510 such as via the bus 502. The main memory 530, the static memory 534, and storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile devices will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 530, 532, 534, and/or memory of the processor(s) 510) and/or storage unit 536 may store one or more sets of instructions and data structures (e.g., software) embodying or utilized by any one or more of the methodologies or functions described herein. These instructions (e.g., the instructions 516), when executed by processor(s) 510, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

We claim:

1. A web-based communication application configured to facilitate audio and video communications over a network, the application comprising:

a main application executed in its own execution environment and subject to a first content security policy indicating one or more directives for resource loading and resource execution;

a first web worker i) loaded by the main application from a resource indicated by the first content security policy, ii) executed in its own execution environment, ii) specifying a second content security policy indicating one or more directives for resource loading and resource execution, and iv) upon receiving a request from the main application for a second web worker or a WebAssembly module, is configured to:

determine the request identifies a second web worker or a WebAssembly module satisfying the first and second content security policies; and responsive to determining the request identifies a second web worker or a WebAssembly module satisfying the first and second content security policies:

load and execute a second web worker from a resource satisfying the first and second content security policies; or load and compile a WebAssembly (WASM) module from a resource consistent with the first and second content security policies;

after the WASM module is loaded and compiled by the first web worker, instantiating, by the main application, an instance of the WASM module to perform a function related to audio or video processing on behalf of the communication application when facilitating an audio or video call.

2. The web-based communication application of claim 1, wherein the first content security policy of the main application includes:

directives for allowing script sources and worker sources from a specified content delivery network; and directives for allowing connection sources and child sources from the specified content delivery network.

3. The web-based communication application of claim 1, wherein the second content security policy of the first web worker includes:

directives for allowing script sources and worker sources from a specified content delivery network; and directives permitting the loading and execution of the WASM module from a specified resource.

4. The web-based communication application of claim 1, wherein the main application initializes the first web worker by posting a message to the first web worker, specifying a type of function to be performed.

5. The web-based communication application of claim 4, wherein the first web worker, upon receiving the message from the main application, is configured to:

fetch the WASM module from a specified source; and compile the fetched WASM module;

wherein the compiled WASM module is subsequently instantiated by the main application.

6. The web-based communication application of claim 1, wherein the function performed by the WASM module relates to at least one of:

noise suppression during an audio or video communication session;

acoustic echo cancellation for eliminating echo occurring during an audio or video call;

voice quality enhancement for enhancing voice quality during an audio or video call; and background blur for blurring the background to separate a foreground object from the background during a video call.

7. The web-based communication application of claim 1, wherein the main application and the first web worker are configured to communicate via message passing, allowing the main application to provide instructions and receive results from the WASM module instantiated by the first web worker.

8. A method for facilitating audio and video communications over a network in a web-based communication application, the method comprising:

executing a main application in its own execution environment, wherein the main application is subject to a first content security policy indicating one or more directives for resource loading and resource execution;

loading, by the main application, a first web worker from a resource indicated by the first content security policy;

executing the first web worker in its own execution environment, wherein the first web worker specifies a second content security policy indicating one or more directives for resource loading and resource execution;

receiving, at the first web worker, a request from the main application for a second web worker or a WebAssembly module;

determining, by the first web worker, that the request identifies a second web worker or a WebAssembly module satisfying the first and second content security policies;

responsive to determining the request identifies a second web worker or a WebAssembly module satisfying the first and second content security policies:

loading and executing a second web worker from a resource satisfying the first and second content security policies; or loading and compiling a WebAssembly (WASM) module from a resource consistent with the first and second content security policies;

after the WASM module is loaded and compiled by the first web worker, instantiating, by the main application, an instance of the WASM module; and performing, by the instantiated WASM module, a function related to audio or video processing on behalf of the communication application when facilitating an audio or video call.

9. The method of claim 8, wherein the first content security policy of the main application includes:

directives for allowing script sources and worker sources from a specified content delivery network; and directives for allowing connection sources and child sources from the specified content delivery network.

10. The method of claim 8, wherein the second content security policy of the first web worker includes:

directives for allowing script sources and worker sources from a specified content delivery network; and directives permitting the loading and execution of the WASM module from a specified resource.

11. The method of claim 8, wherein initializing the first web worker comprises:

posting, by the main application, a message to the first web worker, wherein the message specifies a type of function to be performed.

12. The method of claim 8, wherein upon receiving the message from the main application, the first web worker:

fetches the WASM module from a specified source; and compiles the fetched WASM module;

wherein the compiled WASM module is subsequently instantiated by the main application.

13. The method of claim 8, wherein the function performed by the WASM module relates to at least one of:

noise suppression during an audio or video communication session;

acoustic echo cancellation for eliminating echo occurring during an audio or video call;

voice quality enhancement for enhancing voice quality during an audio or video call; and background blur for blurring the background to separate a foreground object from the background during a video call.

14. The method of claim 8, wherein the main application and the first web worker communicate via message passing, allowing the main application to provide instructions and receive results from the WASM module instantiated by the first web worker.

15. A system for facilitating audio and video communications over a network in a web-based communication application, the system comprising:

a processor; and a memory storing executable instructions that, when executed by the processor, cause the system to perform operations comprising:

executing a main application in its own execution environment, wherein the main application is subject to a first content security policy indicating one or more directives for resource loading and resource execution;

loading, by the main application, a first web worker from a resource indicated by the first content security policy;

executing the first web worker in its own execution environment, wherein the first web worker specifies a second content security policy indicating one or more directives for resource loading and resource execution;

receiving, at the first web worker, a request from the main application for a second web worker or a WebAssembly module;

determining, by the first web worker, that the request identifies a second web worker or a WebAssembly module satisfying the first and second content security policies;

responsive to determining the request identifies a second web worker or a WebAssembly module satisfying the first and second content security policies:

loading and executing a second web worker from a resource satisfying the first and second content security policies; or loading and compiling a WebAssembly (WASM) module from a resource consistent with the first and second content security policies;

after the WASM module is loaded and compiled by the first web worker, instantiating, by the main application, an instance of the WASM module; and performing, by the instantiated WASM module, a function related to audio or video processing on behalf of the communication application when facilitating an audio or video call.

16. The system of claim 15, wherein the first content security policy of the main application includes:

directives for allowing script sources and worker sources from a specified content delivery network; and directives for allowing connection sources and child sources from the specified content delivery network.

17. The system of claim 15, wherein the second content security policy of the first web worker includes:

directives for allowing script sources and worker sources from a specified content delivery network; and directives permitting the loading and execution of the WASM module from a specified resource.

18. The system of claim 15, wherein the operations further comprise:

initializing the first web worker by posting a message from the main application to the first web worker, wherein the message specifies a type of function to be performed.

19. The system of claim 18, wherein upon receiving the message from the main application, the first web worker:

fetches the WASM module from a specified source; and compiles the fetched WASM module;

wherein the compiled WASM module is subsequently instantiated by the main application.

20. The system of claim 15, wherein the function performed by the WASM module relates to at least one of:

noise suppression during an audio or video communication session;

acoustic echo cancellation for eliminating echo occurring during an audio or video call;

voice quality enhancement for enhancing voice quality during an audio or video call; and background blur for blurring the background to separate a foreground object from the background during a video call.

* * * * *